United States Patent [19]

Wallace

[11] 4,107,793

[45] Aug. 15, 1978

[54] MIXER APPARATUS FOR CONTINUOUSLY COAGULATING AN AQUEOUS LATEX AND CONSOLIDATING AS A PASTE COAGULUM

[75] Inventor: James L. Wallace, Wilbraham, Mass.

[73] Assignee: Monsanto Company, St. Louis, Mo.

[21] Appl. No.: 800,836

[22] Filed: May 26, 1977

[51] Int. Cl.² .............................................. B01F 7/16
[52] U.S. Cl. ..................................... 366/312; 366/327
[58] Field of Search .................... 259/7, 8, 9, 10, 4, 259/5, 6, 21, 22, 23, 24, 25, 26, 43, 44, 45, 46, 106, 107, 108

[56] References Cited

U.S. PATENT DOCUMENTS

| | | | |
|---|---|---|---|
| 2,064,131 | 12/1936 | Tuscan et al. | 259/10 |
| 3,076,637 | 2/1963 | Mozick et al. | 259/8 |
| 3,235,231 | 2/1966 | Dietze et al. | 259/7 |
| 3,321,283 | 5/1967 | Ewald | 259/7 X |
| 3,329,410 | 7/1967 | Rothert | 259/8 X |
| 3,347,529 | 10/1967 | Hoppe et al. | 259/8 |
| 3,522,934 | 8/1970 | Walter | 259/9 |
| 3,536,300 | 10/1970 | Ainsworth et al. | 259/9 |
| 3,583,680 | 6/1971 | Aust et al. | 259/7 |
| 3,734,469 | 5/1973 | Goldstein et al. | 259/8 |
| 3,924,836 | 12/1975 | Bruning et al. | 259/7 |

FOREIGN PATENT DOCUMENTS

| | | | |
|---|---|---|---|
| 602,005 | 7/1960 | Canada | 259/7 |
| 751,261 | 1/1967 | Canada | 259/4 R |
| 1,295,787 | 5/1962 | France | 259/7 |
| 1,047,750 | 12/1958 | Fed. Rep. of Germany | 259/7 |
| 377,199 | 7/1932 | United Kingdom | 259/7 |
| 1,147,185 | 4/1969 | United Kingdom | 259/7 |

Primary Examiner—Stanley N. Gilreath
Attorney, Agent, or Firm—Joseph S. Nelson; William J. Farrington; James C. Logomasini

[57] ABSTRACT

A mixing apparatus for continuously coagulating the polymer of an aqueous latex and consolidating as a paste coagulum comprising a barrel, a rotor positioned therein and being coaxial therewith, said rotor having attached opposed rows of forward angled tab blades and opposed wiping blades axially aligned therewith, said barrel having first and second feed ports at a first end section and a discharge port at the second end section thereof, a closure means and a journal means attached to said rotor at the feed section thereof, the relationship between the elements of said apparatus being such that during operation of said apparatus, said paste coagulum can output from said discharge port when said latex is input to said first port means and a coagulant is input to said second port means.

13 Claims, 4 Drawing Figures

MIXER APPARATUS FOR CONTINUOUSLY COAGULATING AN AQUEOUS LATEX AND CONSOLIDATING AS A PASTE COAGULUM

BACKGROUND OF THE INVENTION

This invention relates to an apparatus for the continuous coagulating and consolidating the coagulated latex as a fluid paste coagulum, said paste being a uniform mixture of a high viscosity fluid phase and a low viscosity fluid phase, said phases being immiscible in one another.

U.S. Pat. No. 3,859,217 discloses an apparatus for continuously separating immiscible high viscosity fluids from low viscosity fluids by shearing screws wherein drag forces carry the more viscous fluid forward leaving the less viscous phase behind as a separated phase. Such devices will operate more efficiently if the two phase are uniformly mixed on a continuous basis and can be fed as a uniform paste to such separating devices.

Hence, there is real need for continuous mixer coagulators that can coagulate latices and form such coagulated latices into forms such as fluid pastes that can be readily handled in downstream processing. Generally, the solid polymer of polymer latices must be recovered from such latices. Prior art processes have used batch operations wherein the latex is coagulated with electrolyte and the polymer filtered from the water phase. Such processes are higher cost, are not readily controlled on a continuous process basis and suffer from loss of fine precipitated polymer during filtration or centrifugation.

The present apparatus provides for continuous coagulation and inversion of phases so that the polymeric phases become the continuous phase of the paste and the immiscible water phase can be readily separated from the paste.

There has now been discovered a new and very useful apparatus for continuously mixing an aqueous latex with an aqueous coagulating medium uniformly so that polymer phase of an aqueous latex is coagulated and partitioned from the aqueous phase into a solvent phase as a oil phase having the water phase dispersed therein providing a consolidated coagulum paste than can be uniformly fed to a separator for separation of the low viscosity aqeuous phase.

In particular, rubber latices that have the rubber particles grafted with monomers by emulsion polymerication may be recovered from the latex, dispersed in additional monomer and mass polymerized to form rubber reinforced polyblends.

The grafted rubber latices, hence, may have the monomers added first, without coagulating the rubber particles, and then fed to the mixing apparatus of the present invention along with a coagulating medium such as an aqueous metal salt solution. As the salt mixes with the aqueous emulsion of the rubber particles, it breaks the water emulsion and the rubber particles are partitioned into a monomer or solvent phase as a oil phase having the water-salt phase dispersed therein with the coagulum taking the form of a fluid paste.

The apparatus for continuously mixing the latex and coagulant must effectively mix the two and consolidate the dispersed oil phase formed into a continuous fluid paste having the water phase dispersed therein. This is accomplished by a novel combination of wiper-densifier blades which by mechanical pressure at the barrel wall densifies the tacky-rubber-solvent oil phase into a continuous phase separating the water into a dispersed water phase. The forward, angled, tab blades pick up the densified paste at the wall and forward it along the barrel for additional working and consolidation by the wiper densifier blades.

The apparatus then has a novel arrangement of angled tab blades for forwarding and mixing in combination with wiper densifying blades to produce, during the operation of said apparatus, a discharged consolidated coagulated paste.

SUMMARY OF THE INVENTION

The present invention relates to a mixer apparatus for continuously coagulating an aqueous polymeric latex and consolidating as a paste coagulum comprising:

(A) a generally cylinderical barrel having first and second feed port means in a first end portion thereof and a discharge port defined in the opposed second end portion thereof, the interior length of said barrel being greater than the interior diameter thereof, (B) a rotor means generally extending through and coaxial with said barrel, (C) at least two opposed rows of forward angled tab blades affixed to said rotor means, said blades having a radial projection from said rotor means, (D) at least two opposed wiper blades affixed to said rotor means having a radial projection from said rotor means and being axially aligned therewith, (E) a journal means, being an axial extension of said rotor permitting rotational movement of said rotor means relative to said barrel, (F) a feed end closure means, and (G) the relationship between said barrel, said rotor, said blades, said ports, said journal and said feed end closure means being such that during operation of said apparatus, said paste coagulum can output from said discharge port means when said latex is input to said first port means and a coagulant is input to said second port means.

FIGURE DESCRIPTION

The invention is better understood by reference to the drawings.

DESCRIPTION OF THE PREFERRED EMBODIMENTS

Figure 1:
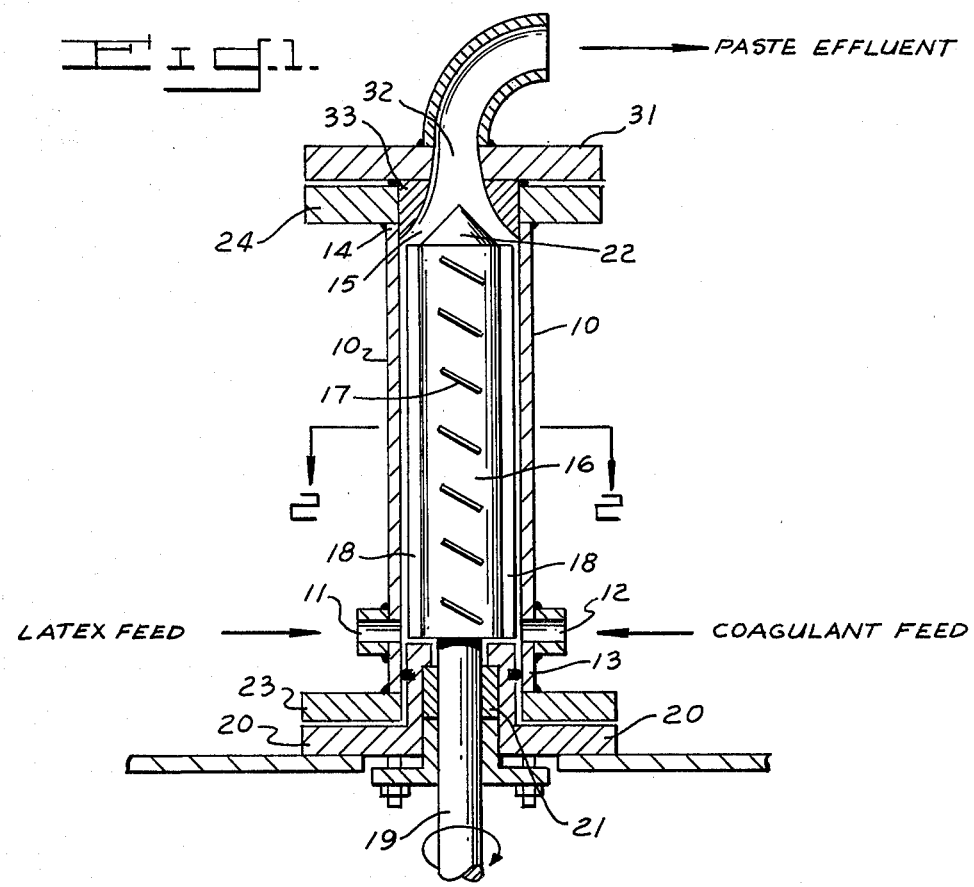
FIG. 1 is a central longitudinal sectional view through an apparatus of the present invention.

FIG. 1 represents a preferred embodiment of the present invention comprising, a generally cylindrical barrel 10, having a first feed port means 11 and second feed port means 12 defined in a first end portion 13, an opposed second end portion 14 having a discharge port 15 defined therein. As shown in FIG. 1, the barrel generally has an interior length greater than the interior diameter thereof.

A rotor means 16 generally extending through and coaxial with said barrel having at least two opposed rows of forward angled tab blades 17 affixed to said rotor, said blades having a radial projection from said rotor means; at least two opposed wiper blades 18 affixed to said rotor means 16, having a radial projection from said rotor means 16 and being axially aligned therewith; a journal means 19, being an axially extension of said rotor 16, permitting rotational movement of said rotor means 16, relative to said barrel means 10; a feed end closure means 20, having a packing means 21. A tip means 22, attached to end portion of said rotor 16 feeding said discharge port 15. Said barrel 10, having a first ring flange 23, attached to said first end portion 13, and a second ring flange 24, attached to said second end portion 14, said discharge port 15, attached to said second ring flange 24. Said feed end closure means 20, attached to said first ring flange 23.

Said wiper blades 18, are continuous along their length and wipe substantially the entire surface of the interior wall of said barrel 10.

Figure 3:
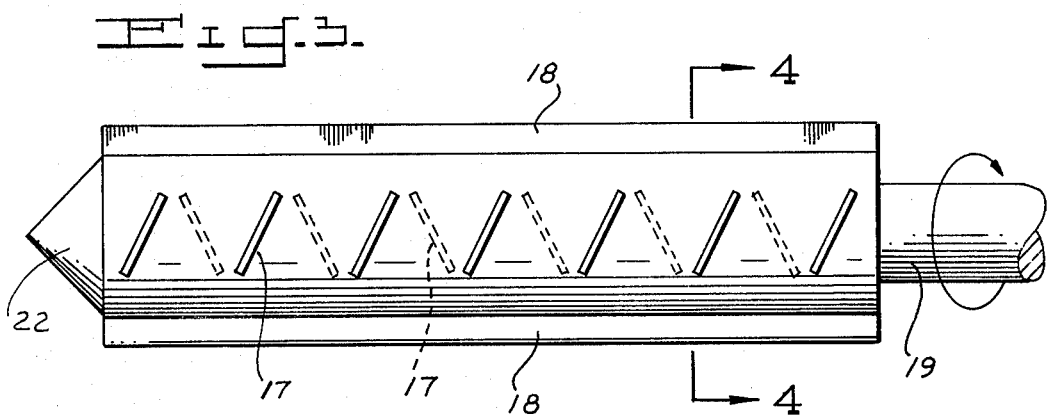
FIG. 3 is a longitudinal sectional view of the rotor means of the apparatus having a journal and tip means and showing the angle tab and wiping blades.

Said opposed rows of tab blades 17, are so arranged that the individual blades of one row are positioned opposite the openings between blades on the opposed row, as shown in FIG. 3, so that substantially the entire surface of said barrel 10, along its length are wiped by the opposed rows of blades 17, during operation of said apparatus.

Figure 2:
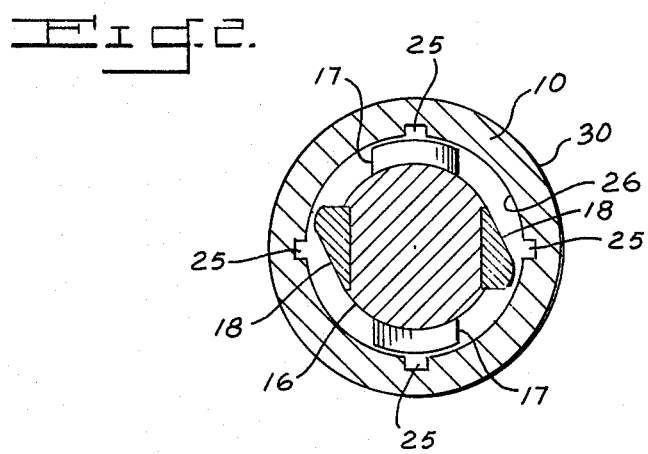
FIG. 2 is a cross-sectional view of a barrel rotor section of the apparatus along line 2—2 of FIG. 1

Said barrel 10, having a plurality of axially aligned slots 25, equally spaced around the interior barrel wall 26, and extending the length of the barrel 10 as shown in FIG. 2.

Figure 4:
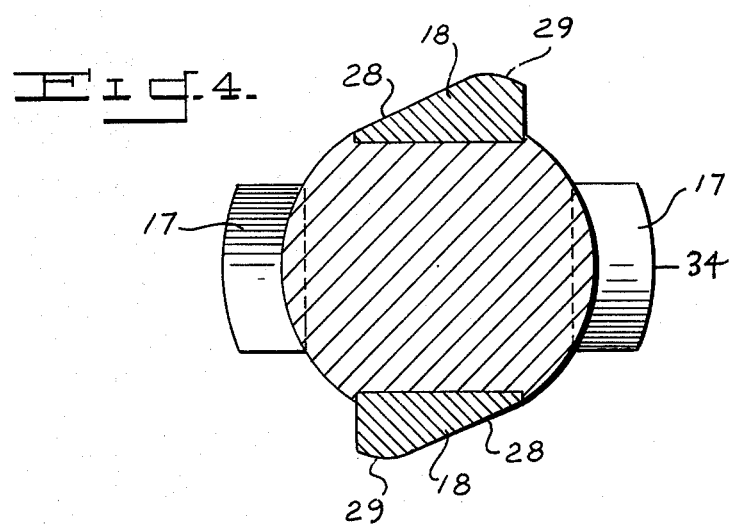
FIG. 4 is a cross-sectional view of the rotor means of the apparatus along line 4—4 of FIG. 3.

Said wiper blades 18, having a leading surface 28, as shown in FIG. 4, tangential to said rotor 16, rising to a predetermined clearance with the interior wall of said barrel 10, said wiper blade 18, having a rounded following surface 29, taking a curvature parallel to said rotor 16.

Said tab blades 17, shown in FIG. 4, are substantially rectangular having a curved longitudinal top surface 34, taking a curvature parallel to said rotor 16, and having a forward angle of from 40 to 60° and a predetermined clearance with the interior wall 26 of said barrel 10 having exterior wall 30.

Said discharge port 15, being extended through said ring flange 24 and a third ring flange 31, shown in FIG. 1, said third ring flange having a discharge port orifice 32 centrally disposed therein, said third ring flange 31, being attached to and having said orifice extended through said second ring flange 24 into said discharge port 15 providing a seal with said discharge port 15 by ring seal 33 attached to said third ring flange 31.

Said journal means 19 is rotated in the direction shown by a powerhead (not shown) adapted to effect rotation of said journal means 19 relative to said barrel. Said powerhead conventionally is a motor directly connected to said journal or through a power transmission means providing a variable speed drive. The journal means can be suspended with any conventional bearing assembly means (not shown) that will stabilize the rotation of said journal means 19 and said rotor means 16 during rotation of said journal and said rotor. A conventional double radial thrust bearing has been found to be operationally stable in keeping said rotor 16 axially aligned with said barrel 10. Said opposed rows of tab blades have from about 6 to 12 blades per row.

EXAMPLES

An apparatus as shown in FIGS. 1-4 was used to coagulate an aqueous polymeric latex and consolidate as a paste coagulum. The barrel was 7 inches (17.5 cm) long having an inside diameter of 2.13 inches (5.3 cm). The rotor had a length of 6 inches (15 cm) and a root diameter of 1.5 inches. The angled tab blades extended radially from said rotor having a clearance of 0.030 inches (0.075 cm) with the interior wall of said barrel. The blades were angled 50° forward from the vertical having a forward pitch relative the rotation of the rotor. Two rows of opposed tab blades were used with six blades in each row. The tab blades were 15/16 inches (2.34 cm) wide at their base and 3/16 inches (0.47 cm) in thickness. Two opposed wiper blades were used each blade being 6 inches (15 cm) long and having a clearance at their extremity of 0.125 inches (0.311 cm) with the interior wall of the barrel. The wiper blades were 1 inch (2.5 cm) wide at the base.

The wiper blades have a compression ratio as defined by rotor root clearance with interior wall of barrel divided by the wiper blade clearance of about 2.5. This ratio can be varied from 1.5 to 4:1 depending on the density of paste desired. The tip means on the end of the rotor had a tip angle of 50°. The length to diameter ratio (L/D) of the rotor can be varied from 3:1 to 6:1 consistent with the dwell time desired for the coagulation and consolidation of the latex to a paste coagulum. The apparatus described provides a dwell time of about 0.33 minutes and can range from 0.25 to 1.0 minutes depending on the feed rate of the feeds to the coagulator. Generally, the open volume of the coagulator with the rotor in place in volume units (e.g. cubic centimeters) divided by the pumping rate in volume units (e.g. cubic centimeters) per minute will give the dwell time experienced by the feeds during mixing expressed herein as minutes. The rpm of the rotor which can be varied from about 75 to 300 rpm. The power head used was a variable speed motor delivering about ¼ HP.

EXAMPLES 1 - 8

A premix stream of 100 parts by volume of latex, containing about 31% by weight of grafted rubber and 20-40 parts by volume of solvent is pumped into the first feed port of the apparatus with the rotor turning at 150 rpm. Simultaneously, a coagulant stream of an electrolyte solution in water of 6 to 10 parts by volume ($Al_2(SO_4)_3$ 4% by weight) is pumped into the second feed port in a series of runs as tabulated in Table 1 to demonstrate the conditions under which paste coagulum of good quality is produced. The most desirable paste is one which is cohesive, smooth surfaced, nonporous, moderately firm, well formed, of clear white color and free of any excess surface water. Poor quality pastes are poorly consolidated, wet and noncohesive at one extreme to stiff dry, rough and brittle pastes which are noncohesive. Hence, a smooth cohesive, rubbery thixotropic paste is preferably produced which can be readily pumped to a downstream dewatering device such as disclosed in U.S. Pat. No. 3,859,217.

TABLE 1

| Example | Latex Flow pts by vol.[5] | Salt Flow pts/100 Latex | Organic Solvent Composition | Organic Solvent pts/100 Latex | Rotor RPM | Paste Quality |
|---|---|---|---|---|---|---|
| 1 | 100 | 8 | 100% AN[1] | 20 | 150 | Fair |
| 2 | 300 | 8 | 100% AN | 20 | 150 | Good |
| 3 | 100 | 8 | Amix[2] | 30 | 150 | Good |

TABLE 1-continued

| Example | Latex Flow pts by vol.[5] | Salt Flow pts/100 Latex | Organic Solvent Composition | Organic Solvent pts/100 Latex | Rotor RPM | Paste Quality |
|---|---|---|---|---|---|---|
| 4 | 300 | 8 | Amix | 30 | 150 | Good |
| 5 | 100 | 8 | Bmix[3] | 30 | 150 | Very Good |
| 6 | 300 | 8 | Bmix | 30 | 150 | Good |
| 7 | 100 | 8 | Cmix[4] | 30 | 150 | Very Good |
| 8 | 300 | 8 | Cmix | 30 | 150 | Very Good |

[1] Acrylonitrile (AN)
[2] Amix = 25% Acrylonitrile, 50% Styrene, 25% Propionitrile
[3] Bmix = 35% Acrylonitrile, 25% Styrene, 40% Propionitrile
[4] Cmix = 37.5% Acrylonitrile, 37.5% Styrene, 25% Propionitrile
[5] Feed rate cubic centimeters/minute (c.c.)

EXAMPLES 9 – 16

Examples 1 – 8 were repeated at a rotor speed of 75 rpm and the paste quality was found to be good.

EXAMPLES 17 – 24

Examples 1 – 8 were repeated at rotor speeds of 300 rpm and the paste quality was found to be good. The apparatus is not considered sensitive to rpm. Generally, if the rpm is lower than about 75 rpm the paste is not well consolidated and at a rpm above 300 rpm the solvent-polymer phase was found to be discontinuous.

The process for continuously coagulating a polymeric latex and consolidating as a paste coagulum in an apparatus comprising a barrel containing first and second feed ports, a rotor having opposed rows of angled tab blades and opposed wiper blades, a feed end closure means and a discharge port in an end of said barrel opposed to said feed ports, the steps comprising:

A. continuously feeding an aqueous polymeric latex and an organic solvent to said first feed port simultaneously with a coagulant to said second feed port,
B. continuously mixing said coagulant, said latex and said solvent uniformly in said barrel by means of said tab and wiper blades of said rotor rotating, in said barrel,
C. coagulating said latex forming a coagulum of a solvent-polymer phase and an aqueous phase;
D. conveying said coagulum along, the interior wall of said barrel toward said discharge port by the action of said angled tab blades on said coagulum while,
E. consolidating said solvent-polymer phase to a continuous phase having an aqueous phase dispersed therein by the action of said wiper blades and coagulum taking the form of a paste, and
F. discharging said paste from said discharge port as a paste coagulum.

The process is carried out in the preferred embodiment shown in FIG. 1 wherein said aqueous polymeric latex comprises grafted diene rubber particles dispersed in water with an emulsifying agent, said grafted diene rubber being grafted with monomers selected from the group consisting of monoalkenyl aromatic and alkenyl nitrile or mixtures thereof. Said organic solvent can be a monoalkenyl aromatic monomer, an alkenyl nitrile monomer, a acrylic monomer, a ketone, a saturated nitrile, a lower carboxylic ester, a formamide, an acetamide and mixtures thereof, said organic solvent being a solvent for said grafted rubber. Said organic solvent is selected from the group consisting of propionitrile, acetonitrile, butyronitrile, isobutyronitrile, acetone, cyclohexanone, methylacetate, ethyl acetate, butyl acetate, dimethylformamide, diethylformamide, styrene, acrylonitrile and mixtures thereof.

Said apparatus can be operated in a generally vertical orientation with said conveying being generally upward to said discharge port. Said apparatus can be operated in the generally vertical orientation with said conveying being generally downward to said discharge port. Said apparatus can be operated in a generally horizontal orientation with said conveying being generally horizontal to said discharge port.

Said aqueous latex can be mixed with said solvent by premixing prior to feeding in step (A). Said premixing is realized by feeding said latex and said solvent continuously into a common conduit simultaneously and allowing in-line flow to premix said latex and solvent prior to step (A). Said premixing can be realized by feeding said latex and said solvent simultaneously into an in-line static mixer prior to step (A).

In operation of the present process, for each 100 parts of latex fed in step (A) about 20 to 48 parts of solvent are fed along with about 6–10 parts of coagulant, said coagulant being an aqueous solution containing 2 to 6% by weight of an inorganic electrolyte and said latex containing 25 to 45% by weight of grafted diene rubber particles. Said inorganic electrolyte can be selected from the group consisting of $Al_2(SO_4)_3$, $18H_2O$, $MgSO_4$, $NaCl$, $Na_2SO_4$, inorganic acids or mixtures thereof. Said grafted diene rubber particles present in said aqueous latex are grafted with 15 to 60 parts of monomer per 100 parts of rubber, said monomers comprising about 50–90% by weight of alkenyl aromatic and about 10 to 50% by weight alkenyl nitrile. Said diene rubber particles have an average particle size of from about 0.05 to 1.0 microns. Said grafted diene rubber particles contain a diene rubber selected from the group consisting of polybutadiene, butadiene-styrene copolymer, butadiene-acrylonitrile copolymer or mixtures thereof. Said monoalkenyl aromatic monomer can be styrene, alpha-methylstyrene, chlorostyrene or mixtures thereof. Said alkenyl nitrile monomer can be acrylonitrile, methacrylonitrile, ethylacrylonitrile or mixtures thereof.

What is claimed is:

1. A mixer apparatus for continuously coagulating an aqueous polymeric latex and consolidating as a paste coagulum comprising:
   (A) a generally cylinderical barrel having first and second feed port means in a first end portion thereof and a discharge port defined in the opposed second end portion thereof, the interior length of said barrel being greater than the interior diameter thereof,
   (B) a rotor means generally extending through and coaxial with said barrel,
   (C) at least two diametrically opposed longitudinally extending rows of tab blades affixed to said rotor means each tab blade having a radial projection from said rotor means and being angled relative to the axis of said rotor means so as to convey the coagulum toward said discharge port, said opposed rows of tab blades are so arranged that the individual blades of one row are positioned opposite to the openings between blades on the opposed row so that substantially the entire interior surface of said barrel along its length are wiped by the opposed rows of blades during operation of said apparatus, (D) at least two diametrically opposed wiper densifier blades affixed to said rotor means each wiper blade having a radial projection from said rotor means and extending along the length thereof wherein said wiper blades have a leading surface tangential to said rotor rising to a predetermined clearance with the interior wall of said barrel, said wiper blade having a rounded following surface taking a curvature parallel to said rotor, (E) a journal means, being an axial extension of said rotor permitting rotational movement of said rotor means relative to said barrel, (F) a feed end closure means, and (G) the relationship between said barrel, said rotor, said blades, said ports, said journal and said feed end closure means being such that during operation of said apparatus, said paste coagulum can output from said discharge port means when said latex is input to said first port means and a coagulant is input to said second port means.

2. An apparatus of claim 1, having a tip means attached to an end portion of said rotor feeding said discharge port means.

3. An apparatus of claim 1 wherein said barrel has a first ring flange attached to said first end portion and a second ring flange attached to said second end portion thereof.

4. An apparatus of claim 3 wherein said end closure means is attached to said first ring flange.

5. An apparatus of claim 4 wherein said end closure means is attached to said first ring flange.

6. An apparatus of claim 1 wherein said wiper blades are continuous along their length and wipe substantially the entire surface of the interior wall of said barrel.

7. An apparatus of claim 1 wherein said barrel has a plurality of slots equally spaced around the interior barrel wall and extending the length of the barrel.

8. An apparatus of claim 1 wherein said tab blades are substantially rectangular having a curved longitudinal top surface taking a curvature parallel to said rotor, said tab blades having a forward angle of from about 40° to 60° and a predetermined clearance with the interior wall of said barrel.

9. An apparatus of claim 1 wherein said discharge port is extended through said second ring flange and a third ring flange, said third ring flange having a discharge port orifice attached thereto.

10. An apparatus of claim 1 wherein said closure means includes a packing means.

11. An apparatus of claim 1 wherein said wiper blades have a compression ratio of from about 1.5 to 4.0.

12. An apparatus of claim 1 wherein said rotor has a length to diameter ratio of from about 3:1 to 6:1.

13. An apparatus of claim 1 wherein said opposed rows of tab blades have from about 6 to 12 blades per row.

* * * * *